Patented Mar. 6, 1951

2,544,231

UNITED STATES PATENT OFFICE 2,544,231

PROCESS OF PRODUCING ALUMINA FROM SLAGS OR SINTERS PREPARED FROM LIME AND ALUMINA-BEARING MATERIALS

Arne Mürer Hollum, Oslo, Norway, William Addison James and William Alexander Semple, Arvida, Quebec, Canada, assignors to Aluminium Laboratories Limited, Montreal, Quebec, Canada, a corporation of Canada No Drawing. Application January 18, 1947, Serial No. 722,956. In Canada January 31, 1946

7 Claims. (Cl. 23—143)

This invention relates to the production of alumina from alumina-bearing raw materials, for example bauxite.

One of the principal methods now used for this purpose is that known as the Pedersen process. In that process as originally practised, bauxite was melted with lime and coke in an electric furnace to give metallic iron and a calcium aluminate slag. The latter was disintegrated and then leached with a solution containing principally sodium carbonate, and a small amount of sodium hydroxide. The resulting pregnant liquor was treated with carbon dioxide to precipitate alumina trihydrate therefrom. Certain essential features of the original Pedersen process, including the leaching operation, are disclosed in United States Patent No. 1,618,105, granted February 15, 1927, on the application of Harald Pedersen, for Process of Manufacturing Aluminum Hydroxide. In later years, when the amount of available electric power was insufficient to permit an increase in the production of calcium aluminate slag, or when the supply of bauxite was not sufficient to permit full scale production, it was found that the same leaching procedure could be used with sinters made from lime and bauxite and other alumina-bearing materials.

The most series disadvantage of the Pedersen process is the high silica content of the alumina obtained therefrom. The reason for this is that, on precipitating alumina trihydrate with carbon dioxide, the proportion of silica to alumina is substantially the same in the precipitate as in the pregnant liquor from which the precipitate was obtained. Since other processes for obtaining alumina, as for example the Bayer process, give a product containing as little as 0.02–0.03% silica, it would be very desirable to obtain a product of this purity from the Pedersen process.

In the original work on the Pedersen process, the leaching solution contained about 30–40 g. p. l. total alkali. This gave a pregnant liquor containing about 30 g. p. l. alumina and about .25% silica reckoned on the basis of alumina. In order to reduce the objectionably high silica thus obtained, the concentration of the leaching solution was progressively decreased to about 18 g. p. l. total alkali, which is that used in current commercial practice. This gives a pregnant liquor containing 14 g. p. l. alumina with a silica content of about 0.1%. This silica content is substantially higher than that obtained by other processes, for example the Bayer process, which gives a product containing as little as 0.02–0.03% silica, but it has not heretofore been found possible to reduce it further.

Thus, the Pedersen process, although it has many advantages over other processes, has hitherto suffered from the very serious disadvantage of the high silica content of the product produced by it, and also from the necessity of operation at very low alkali concentrations and the resulting large volumes of liquid which must be handled.

Leaching in the Pedersen process has heretofore been effected at a temperature of about 40–45° C. It has now been discovered that, although as the temperature of leaching in the Pedersen process is raised to between about 60° C.–70° C. the silica content of the pregnant liquor increases, raising of the leaching temperature above 80° C. results in a sharp decrease in the silica content and at the same time in an increase in the alumina content for any given concentration of alkali, with the result that as the leaching temperature is raised above about 80° C. the alkali concentration of the leaching solution may be increased without increasing the silica content of the final product. It has, moreover, been discovered that at leaching temperatures above about 80° C. an increase in the alkali content of the leaching liquor, at least above about 70 g. p. l., does not appreciably increase the silica content of the pregnant liquor, while it does increase the alumina content. From pregnant liquors prepared at leaching temperatures of about 90° C. with alkali concentrations varying from about 70 g. p. l. to about 170 g. p. l. or more, it has been found possible to obtain alumina precipitates in which the ratio of silica to alumina is as low or lower than in precipitates obtained by the Bayer process.

The process of the invention accordingly consists essentially in leaching a calcium aluminate slag or a sinter prepared from limestone and an alumina-bearing material with a sodium carbonate solution of the type ordinarily used in the Pedersen process, i. e. one containing a small amount of sodium hydroxide, at a temperature of over about 80° C. and preferably one of about 90° C. or more. Although some increase in alumina concentration results from the use of temperatures higher than about 90° C., the increase is generally not likely to be sufficient to warrant the added expense of operation above 100° C., which requires the use of pressure tight vessels. Thus in most cases a temperature of about 90° C. will be found most satisfactory.

The alkali concentration used will depend on well known considerations, it being advantageous to use high concentrations in order to have pregnant liquors of high alumina concentration and thus less volume of liquid to be handled, and also because high concentrations will increase the alumina concentration in the pregnant liquor without substantially increasing the silica concentration and will thus result in precipitates having lower percentage of contents of silica. A further advantage of high alumina concentrations is that alumina trihydrate may be precipitated from the pregnant liquor by seeding with crystals of that compound, as is done in the Bayer process. Precipitation by seeding is superior to precipitation by carbon dioxide, because in the former method the alumina trihydrate precipitates more rapidly than the silica, with the result that alumina of higher purity can be obtained. Alkali concentrations of over 100 g. p. l. and even up to 150 g. p. l. and more, may easily be used. An alkali concentration of 130 g. p. l. (as sodium carbonate) results in a pregnant liquor having an alumina concentration of about 90 g. p. l. at a leaching temperature in the neighborhood of 90° C.

The leaching step of the process according to the present invention should be carried out in two stages, as is known in connection with the Pedersen process. In the first stage of leaching a calcium aluminate slag or a sinter prepared from a lime-bearing material such as limestone and an alumina-bearing material, normally bauxite, is mixed with a solution containing alumina, sodium carbonate, and a small amount of sodium hydroxide, this solution having been obtained from a previous second leaching step. The charge of slag or sinter per unit volume of leaching solution is calculated in the well known way on the basis of the concentrations of alumina, sodium carbonate and sodium hydroxide in the leaching solution, and is such that all the recoverable alumina in the slag or sinter is not leached and that the silica concentrations in the pregnant liquor resulting from the first leaching stage have a low value. The leaching temperature is preferably about 90° C. and the concentration of total alkali in the solution (i. e. sodium carbonate, together with sodium hydroxide) may be from about 70 g. p. l. to any higher concentration which it may be practical or economical to use, there being from the point of view of the process of the invention no upper limit to this concentration. When the first stage leaching has been completed, pregnant liquor is separated from the residue in known manner, the total alkali content of the liquor now consisting largely of sodium hydroxide, part of which is combined with alumina in solution as sodium aluminate and which is usually referred to as total caustic.

Pregnant liquor from the first leaching stage is subjected to a precipitation step for the recovery from it of alumina trihydrate. The precipitation step may, as is known in connection with the Pedersen process, be carried out either entirely by means of carbon dioxide so as to reduce the alumina content of the pregnant liquor in one stage to substantially zero, or may be carried out partly by seeding, as in the Bayer technique, and for the remainder by means of carbon dioxide. The precipitation temperature will be chosen according to well known considerations.

The second stage of leaching is now effected by treating the residue from the first leaching step with the spent liquor from the precipitation step. In this second leaching stage as much alumina as possible is recovered from the residue. The residue from the second leaching stage is washed and discarded.

The following is an example of the practice of the process of the invention. A quantity of sinter prepared from bauxite and limestone was found on analysis to contain:

| | Per cent |
|---|---|
| Loss on ignition | 0.31 |
| $Al_2O_3$ | 38.74 |
| $SiO_2$ | 1.40 |
| CaO | 36.09 |
| $Na_2O$ | 2.46 |
| $P_2O_5$ | 1.33 |

The greater part of the balance of 19.67% was ferric oxide.

This sinter was leached 1½ hours at 90° C. with a liquor containing 130 g. p. l. total alkali, 15 g. p. l. total caustic (calculated as sodium carbonate), and 10 g. p. l. alumina ($Al_2O_3$), the proportions of sinter to liquor being 300 grams to one litre. The pregnant liquor from this leaching step contained 90 g. p. l. alumina, 130 g. p. l. total alkali, 125 g. p. l. total caustic, 0.02 g. p. l. silica ($SiO_2$) and 0.004 g. p. l. $P_2O_5$. By introducing carbon dioxide into this pregnant liquor alumina trihydrate is precipitated, which on calcination yields alumina containing about 0.02% $SiO_2$ and about 0.004% $P_2O_5$. The spent liquor from the precipitation step containing 130 g. p. l. total alkali, 4-6 g. p. l. total caustic and 2-3 g. p. l. alumina is used to leach the sinter residue resulting from the first leaching step above. The liquor from this second leaching step has the composition of the liquor mentioned above as being used for the first leaching step.

It will be noted in the above example that the sinter contained phosphorus and that the precipitate was nevertheless low in phosphorus. It is an advantage of the process of the present invention that phosphorus can be kept out of the precipitate and that accordingly alumina or lime-bearing materials which contain phosphorus may be used in the practice of the process without resulting in the production of a low grade final product.

It is to be understood that the invention is not limited to the details herein specifically described but may be carried out in other ways without departure from its spirit.

What is claimed is:

1. The process of producing alumina from slags or sinters prepared from lime and alumina-bearing materials, which comprises leaching the slag or sinter at a temperature of about 90° C. in a sodium carbonate solution containing free NaOH and having an alkali concentration of over 100 grams per litre.

2. The process of producing alumina from slags or sinters prepared from lime and bauxite, which comprises leaching the slag or sinter at a temperature between about 80° C. and about 100° C. in a sodium carbonate solution containing free NaOH and having an alkali concentration of at least about 130 grams per litre.

3. The process of producing alumina from slags or sinters prepared from lime and alumina-bearing materials, which comprises leaching the slag or sinter in a sodium carbonate solution containing free sodium hydroxide and having a total alkali concentration of at least 70 grams per liter, at a temperature above 80° C. and recovering from said leaching operation an alumina-containing solution having a silica to alumina ratio substantially below that which occurs when the leaching operation is performed with the aforesaid sodium carbonate solution at temperatures of 40° to 70° C.

4. The process of producing alumina from slags or sinters prepared from lime and bauxite, which comprises leaching the slag or sinter in a sodium carbonate solution containing free sodium hydroxide and having a total alkali concentration of at least 70 grams per liter, at a temperature above 80° C. and recovering from said leaching operation an alumina-containing solution having a silica to alumina ratio substantially below that which occurs when the leaching operation is performed with the aforesaid sodium carbonate solution at temperatures of 40° to 70° C.

5. The process of producing alumina from slags or sinters prepared from lime and alumina-bearing materials, which comprises leaching the slag or sinter in a sodium carbonate solution containing free sodium hydroxide and having a total alkali concentration of at least 70 grams per liter, at a temperature of about 90° C. to about 100° C. and recovering from said leaching operation an alumina-containing solution having a silica to alumina ratio substantially below that which occurs when the leaching operation is performed with the aforesaid sodium carbonate solution at temperatures of 40° to 70° C.

6. The process of producing alumina from slags or sinters prepared from lime and bauxite, which comprises leaching the slag or sinter in a sodium carbonate solution containing free sodium hydroxide and having a total alkali concentration of at least 70 grams per liter, at a temperature of at least about 90° C. and recovering from said leaching operation an alumina-containing solution having a silica to alumina ratio substantially below that which occurs when the leaching operation is performed with the aforesaid sodium carbonate solution at temperatures of 40° to 70° C.

7. The process of producing alumina from slags or sinters prepared from lime and alumina-bearing materials, which comprises leaching the slag or sinter in a sodium carbonate solution containing free sodium hydroxide and having a total alkali concentration of at least 70 grams per liter, at a temperature from above 80° C. to about 100° C. and recovering from said leaching operation an alumina-containing solution having a silica to alumina ratio substantially below that which occurs when the leaching operation is performed with the aforesaid sodium carbonate solution at temperatures of 40° to 70° C.

ARNE MÜRER HOLLUM.
WILLIAM ADDISON JAMES.
WILLIAM ALEXANDER SEMPLE.

REFERENCES CITED

The following references are of record in the file of this patent:

UNITED STATES PATENTS

| Number | Name | Date |
|---|---|---|
| 2,250,186 | Noll | July 22, 1941 |
| 2,365,702 | Hignett | Dec. 26, 1947 |
| 2,420,852 | Archibald | May 20, 1947 |